United States Patent [19]
Saito

[11] Patent Number: 6,069,751
[45] Date of Patent: May 30, 2000

[54] PHOTOGRAPHIC LENS AND PHOTOGRAPHING APPARATUS HAVING THE SAME

[75] Inventor: Hiroshi Saito, Kawasaki, Japan

[73] Assignee: Canon Kabushiki Kaisha, Tokyo, Japan

[21] Appl. No.: 09/118,993

[22] Filed: Jul. 20, 1998

[30] Foreign Application Priority Data

Jul. 28, 1997 [JP] Japan ................................. 9-217102

[51] Int. Cl.[7] .............................. G02B 9/14; G02B 9/62; G02B 9/00
[52] U.S. Cl. ............................ 359/785; 359/758; 359/796
[58] Field of Search ................................. 359/758, 773, 359/774, 784, 785, 790, 796, 797

[56] References Cited

U.S. PATENT DOCUMENTS

| | | | |
|---|---|---|---|
| 3,649,103 | 3/1972 | Kamimura | 359/790 |
| 4,787,724 | 11/1988 | Kudo et al. | 359/790 |
| 4,892,398 | 1/1990 | Kudo et al. | 359/708 |
| 5,499,142 | 3/1996 | Ohshita | 359/773 |
| 5,572,369 | 11/1996 | Estelle et al. | 359/785 |
| 5,606,461 | 2/1997 | Ohshita | 359/790 |
| 5,636,065 | 6/1997 | Takato | 359/716 |
| 5,696,621 | 12/1997 | Nakanishi et al. | 354/298 |

FOREIGN PATENT DOCUMENTS

| | | |
|---|---|---|
| 48-5494 | 2/1973 | Japan . |
| 50-2807 | 1/1975 | Japan . |
| 59-34510 | 2/1984 | Japan . |
| 1-133016 | 5/1989 | Japan . |
| 7-60213 | 6/1995 | Japan . |
| 7-92542 | 10/1995 | Japan . |

*Primary Examiner*—Georgia Epps
*Assistant Examiner*—Suzanne Letendre
*Attorney, Agent, or Firm*—Fitzpatrick, Cella, Harper & Scinto

[57] ABSTRACT

A photographic apparatus includes, in order from an object side to an image side, a positive first lens of meniscus shape convex toward the object side made from plastic, a negative second lens of bi-concave shape made from plastic, a positive third lens of bi-convex shape made from glass material, and a stop, wherein the following conditions are satisfied:

$$0.8 < f1/f < 1.18 \qquad (1)$$

$$0.95 < (td+sk)/f < 1.12 \qquad (2)$$

where f1 and f are focal lengths of the first lens and the entire photographic lens, respectively, td is a distance from a lens surface on the object side of the first lens to a lens surface on the image side of the third lens, and sk is a back focal distance during focusing on an infinitely distant object.

6 Claims, 5 Drawing Sheets

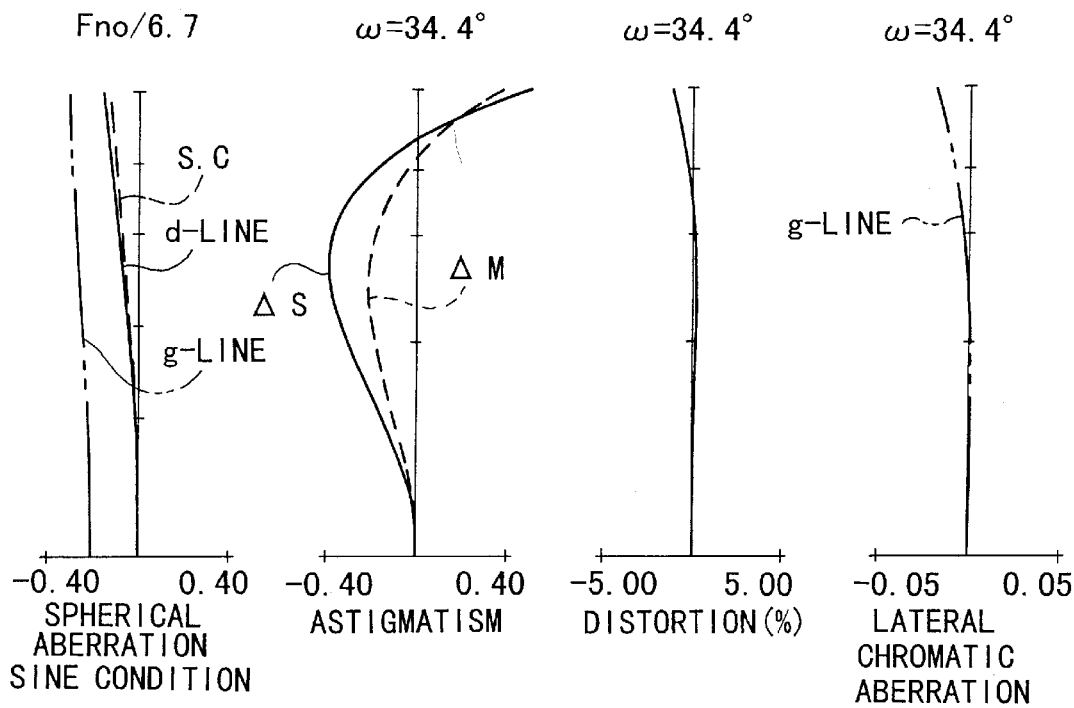
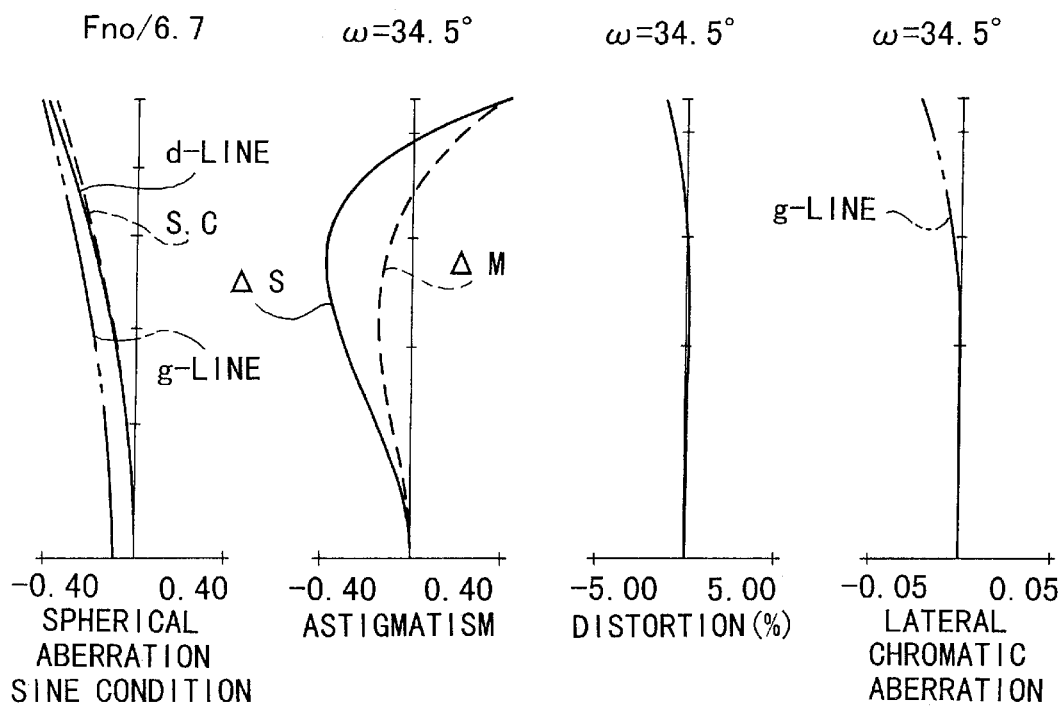

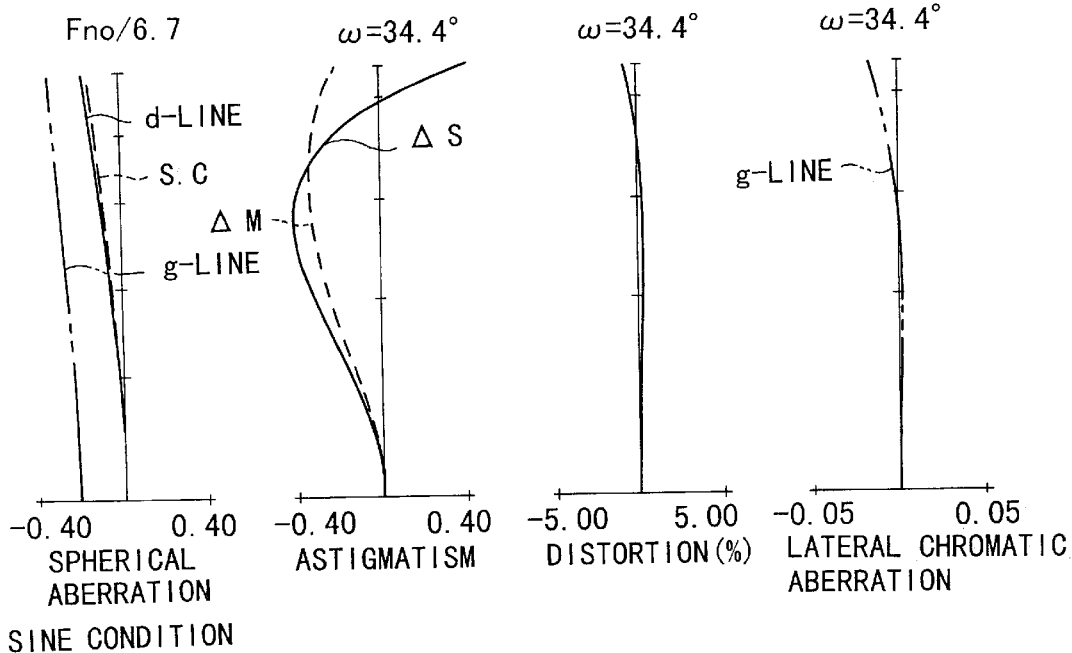
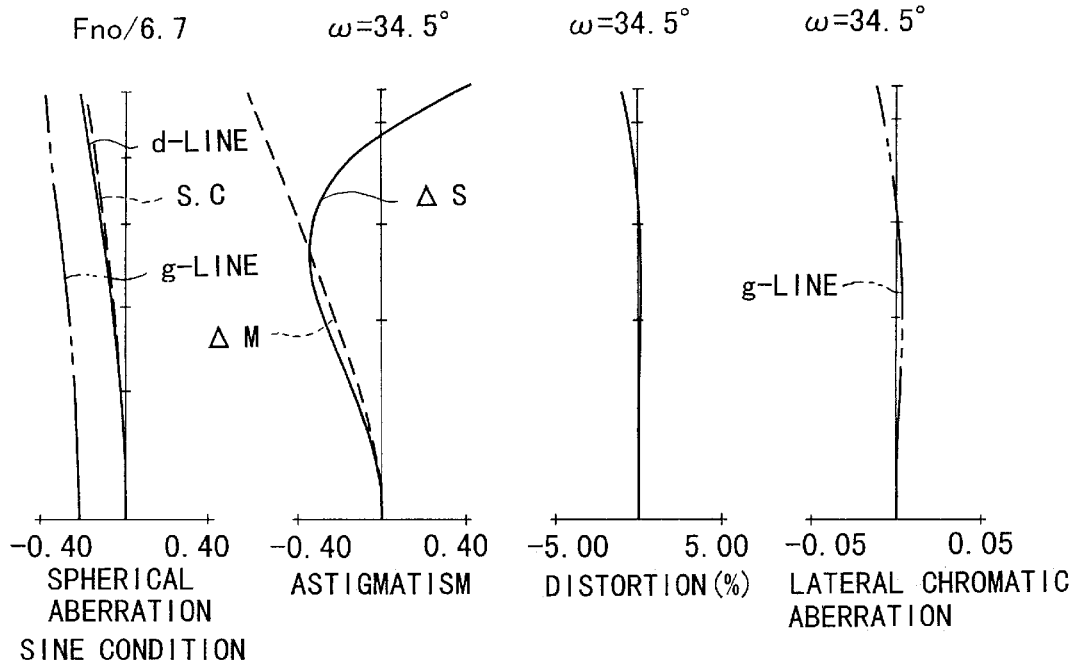

PHOTOGRAPHIC LENS AND PHOTOGRAPHING APPARATUS HAVING THE SAME

BACKGROUND OF THE INVENTION

1. Field of the Invention

The present invention relates to photographic lenses and, more particularly, a photographic lens comprising three lens components in total with a stop behind the lens system. Still more particularly, the invention relates to a photographic lens of back-stop type whose angle of view is widened to about 70 degrees, while still permitting aberrations to be corrected well over the entire area of the image frame, with a short total length of the entire lens system, suited to still cameras for the lens shutter, or video cameras.

2. Description of Related Art

Heretofore, for small-sized cameras such as a lens-shutter camera, there are widely used a triplet-type photographic lens comprising, in order from an object side, a positive lens, a negative lens and a positive lens, because relatively-good optical constants can be obtained by a small number of lens elements.

In the triplet type of photographic lens, there is a one that has a stop disposed behind the lens system. The use of such a back-stop type of photographic lens leads to make it relatively easy to reduce the size of the entire lens system. Further, the mechanical mounting for the lens becomes simpler in structure, and the focusing can be adjusted accurately and reliably. So, this type has been widely used in cameras.

Although the triplet-type photographic lens enjoys the advantages described above, when it is designed to widen the angle of view, the triplet-type photographic lens tends to produce large astigmatism in the marginal zone of the image frame.

For this reason, Japanese Laid-Open Patent Application No. Sho 59-34510, for example, has made a proposal that, for all the lens elements, glass materials of high refractive indices are selected to sustain the good optical performance in the marginal zone.

However, the glass materials of high refractive indices are expensive and their handling is difficult.

On this account, Japanese Laid-Open Patent Application No. Hei 1-133016 and Japanese Patent Publications No. Hei 7-60213 and No. Hei 7-92542 have made an alternative proposal of utilizing plastic material in manufacturing some of the components of the photographic lenses, since this material is amenable to relatively easy production techniques by injection molding.

Besides these, the use of the triplet form in the back-stop type photographic lenses is disclosed in, for example, Japanese Patent Publications No. Sho 48-5494 and No. Sho 50-2807.

Of the photographic lenses proposed in the above-cited references, a photographic lens proposed in Japanese Patent Publications No. Hei 7-60213 and No. Hei 7-92542 has its front or first lens element made up by using a glass material of high refractive index. Therefore, the outer diameter of the first lens element becomes larger than those of the second and third lens elements. Further, as the radius of curvature of the front surface has to be small, other problems arise in that large aberrations are produced and that the size of the entire lens system tends to increase greatly.

In a photographic lens proposed in Japanese Laid-Open Patent Applications No. Hei 1-133016, an aspheric surface is used in combination with the glass material of high refractive index in the rearmost or third lens element of positive refractive power. This photographic lens is, however, as narrow in the angle of view as 60 degrees, and the total length of the entire lens system tends to become relatively long.

A photographic lens proposed in Japanese Patent Publications No. Sho 48-5494 and No. Sho 50-2807 is relatively narrow in the angle of view, being 55 degrees. In addition, the ratio of the distance between the first lens surface and the image plane to the focal length, i.e., the so-called "telephoto" ratio, is more than 1.1, so that there is a tendency to have a relatively long total length of the entire lens system.

BRIEF SUMMARY OF THE INVENTION

The present invention is to employ the triplet form with a stop disposed behind the lens system and sets forth proper rules of design for the lens shapes and other parameters. It is, therefore, an object of the invention to provide a back-stop type photographic lens in which the total length of the entire lens system is shortened to a compact size and, when the angle of view is widened, the image aberrations are kept in good balance over the entire area of the image frame.

To attain the above object, in accordance with an aspect of the invention, there is provided a photographic lens of back-stop type, which comprises, in order from an object side to an image side, a positive first lens of meniscus shape convex toward the object side made from plastic, a negative second lens of bi-concave shape made from plastic, a positive third lens of bi-convex shape made from glass material, and a stop, wherein the following conditions are satisfied:

$$0.8 < f1/f < 1.18 \tag{1}$$

$$0.95 < (td+sk)/f < 1.12 \tag{2}$$

where f1 and f are focal lengths of the first lens and the entire photographic lens, respectively, td is a distance from a lens surface on the object side of the first lens to a lens surface on the image side of the third lens, and sk is a back focal distance during focusing on an infinitely distant object.

The above and further objects and aspects of the invention will become apparent from the following detailed description of a preferred embodiment thereof taken in conjunction with the accompanying drawings.

BRIEF DESCRIPTION OF THE SEVERAL VIEWS OF THE DRAWING

FIGS. 2A to 2D are graphic representations of the various aberrations of the numerical example 1.

FIGS. 3A to 3D are graphic representations of the various aberrations of a numerical example 2.

FIGS. 4A to 4D are graphic representations of the various aberrations of a numerical example 3.

FIGS. 5A to 5D are graphic representations of the various aberrations of a numerical example 4.

DETAILED DESCRIPTION OF THE INVENTION

Hereinafter, a preferred embodiment of the invention will be described in detail with reference to the drawings.

Figure 1:
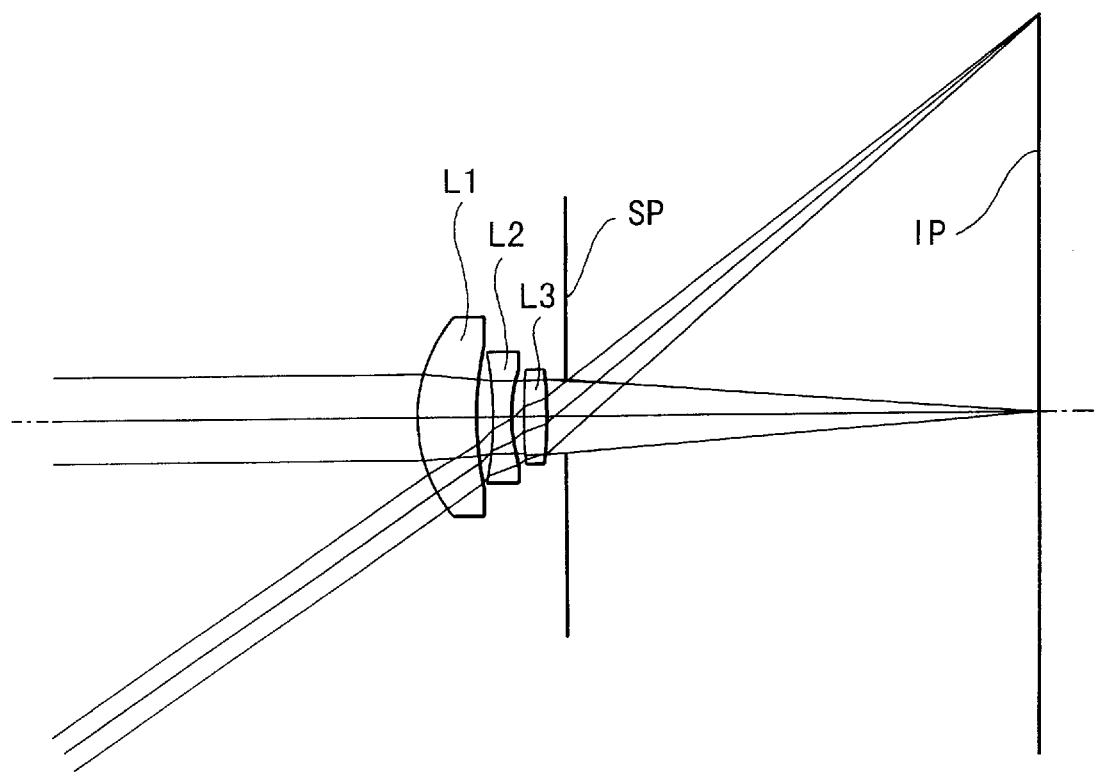
FIG. 1 is a longitudinal section view of a numerical example 1 of the photographic lens.
Figures 6A, 6B, 6C, 6D:
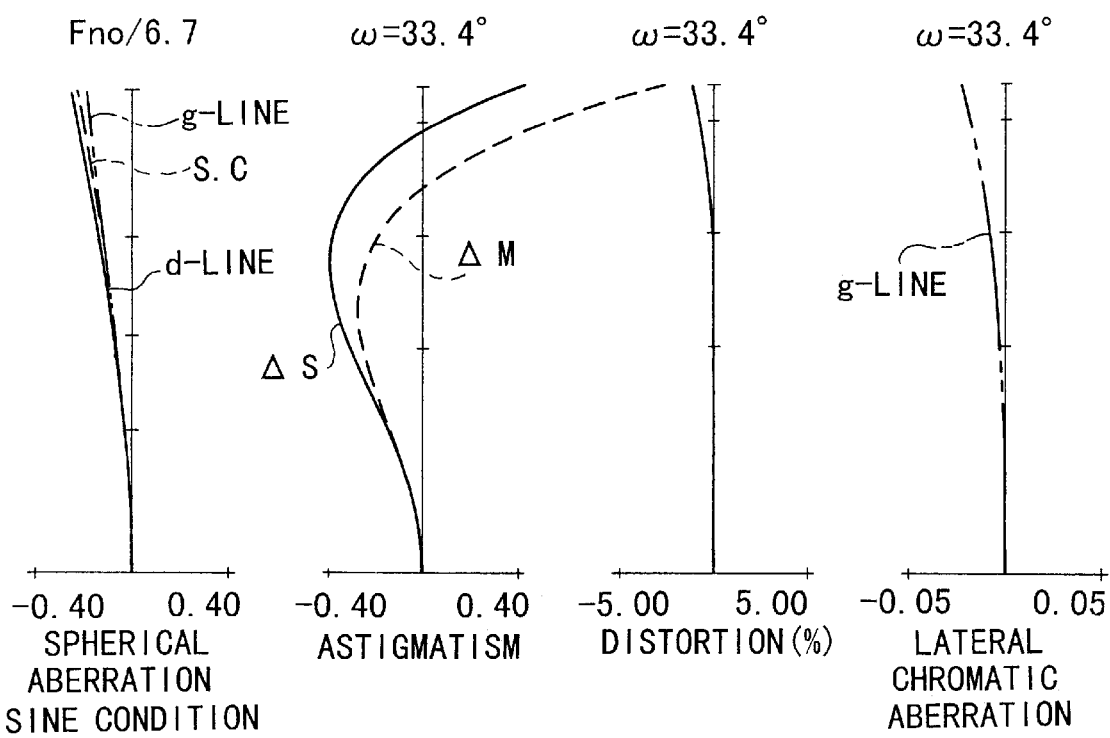
FIGS. 6A to 6D are graphic representations of the various aberrations of a numerical example 5.

FIG. 1 in lens block diagram shows the embodiment of the invention with respect to a numerical example 1, whose data will be described later.

Referring to FIG. 1, a positive first lens L1 is formed to a meniscus shape convex toward the object side and is made from plastic such as PMMA. A negative second lens L2 is formed to a bi-concave shape and is made from plastic such as polycarbonate. A positive third lens L3 is formed to a bi-convex shape and is made from glass material. In the back space between the third lens L3 and an image plane IP, there is disposed a stop SP together with a shutter means (not shown). All the surfaces of the first, second and third lenses are made spherical. In addition, by specifying the materials and shapes for all the lens elements as described above, and by determining the design parameters so as to satisfy the conditions (1) and (2) described above, the size of the entirety of the lens system is reduced while still maintaining a high optical performance to be achieved over the entire area of the image frame.

The technical significance of each of the above-described conditions (1) and (2) is explained below.

The inequalities of condition (1) give a range for the refractive power of the first lens. When the lower limit of the condition (1) is exceeded, as this means that the refractive power of the first lens is too strong, astigmatism becomes difficult to correct. When the upper limit is exceeded, curvature of field, particularly for the marginal zone, becomes difficult to correct.

The inequalities of condition (2) give a range for the total length of the entire lens system (or the distance from the front vertex to the image plane). When the lower limit is exceeded, spherical aberration and astigmatism are taken out of good balance. When the upper limit is exceeded, the total length of the entire lens system becomes longer than necessary. At the same time, the good balance between field curvature and coma collapses. So, it becomes difficult to keep good optical performance in the marginal zone of the image frame.

Within the framework described above in the embodiment, in order to achieve further improvements of the compact form of the entire lens system and a further widening of the angle of view, while still permitting high optical performance to be obtained over the entire area of the image frame, it is preferable to satisfy at least one of the following groups of conditions.

(A1) Letting a refractive index of the material of the i-th lens element be denoted by Ni, the following conditions are satisfied:

$$1.45 < N1 < 1.55 \quad (3)$$

$$1.55 < N2 < 1.65 \quad (4)$$

$$1.75 < N3 \quad (5).$$

The inequalities of conditions (3), (4) and (5) give ranges for the refractive indices of all the lens elements and have an aim to further widen the angle of view in such a manner that the optical performance is kept good over the entire area of the image frame.

When the lower limit of the condition (3), or the upper or lower limit of the condition (4) is exceeded, it becomes difficult to correct spherical aberration and coma in good balance.

When the upper limit of the condition (3) or the lower limit of the condition (5) is exceeded, it becomes difficult to correct curvature of field and astigmatism.

(A2) Letting the focal lengths of the first lens and the third lens be denoted by f1 and f3, respectively, the following condition is satisfied:

$$2 < f1/f3 < 4 \quad (6).$$

The inequalities of condition (6) give a range for the ratio of the refractive powers of the first lens and the third lens. When the lower limit is exceeded, distortion comes to deteriorate. When the upper limit is exceeded, the balance of image focuses comes to worsen.

(A3) Letting the focal length of the i-th lens be denoted by fi, the axial separations between the first lens and the second lens and between the second lens and the third lens denoted by D2 and D4, respectively, the distance from a lens surface on the object side of the first lens to a lens surface on the image side of the third lens denoted by td, and the focal length of the entire lens system denoted by f, the following conditions are satisfied:

$$0.2 < td/f < 0.25 \quad (7)$$

$$-1 < f2/f3 < -0.8 \quad (8)$$

$$1 < D2/D4 < 2.5 \quad (9)$$

$$-0.4 < f2/f < -0.25 \quad (10).$$

The inequalities of condition (7) give a range for the lens thickness (or the length from the first lens surface to the last surface). When the lower limit is exceeded, the desired F-number is hardly secured. In other words, the lens system becomes darker. When the upper limit is exceeded, the physical length of the entire lens system becomes longer than necessary. At the same time, field curvature is taken out of good balance. The inequalities of condition (8) give a range for the ratio of the focal lengths of the second lens and the third lens. When the lower limit is exceeded, coma and distortion deteriorate. When the upper limit is exceeded, it becomes difficult to correct coma and chromatic aberrations.

The inequalities of condition (9) give a range for the ratio of the air separation D2 between the first lens and the second lens to the air separation D4 between the second lens and the third lens. When the lower limit is exceeded, spherical aberration deteriorates. When the upper limit is exceeded, the balance of field curvature deteriorates in the marginal zone of the image frame. The inequalities of condition (10) give a range for the power ratio of the second lens. When the lower limit is exceeded, coma increases largely. When the upper limit is exceeded, the balance of spherical aberration and distortion comes to deteriorate.

Next, five numerical examples 1 to 5 of the invention are shown. In the numerical data for the examples 1 to 5, Ri is the radius of curvature of the i-th lens surface, when counted from the object side, Di is the i-th lens thickness or air separation, when counted from the object side and Ni and vi are respectively the refractive index and Abbe number of the material of the i-th lens element, when counted from the object side.

The aberrations of the photographic lenses of the numerical examples 1 to 5 are shown in FIGS. 2A to 2D through FIGS. 6A to 6D, respectively.

The values of the factors in the above-described conditions (1) to (10) for the numerical examples 1 to 5 are listed in Table-1.

(Numerical Example 1)

| f = 31.57 | Fno = 1:6.7 | | 2ω = 68.8° |
|---|---|---|---|
| R1 = 8.341 | D1 = 3.30 | N1 = 1.49171 | ν 1 = 57.4 |
| R2 = 18.190 | D2 = 0.92 | | |
| R3 = −16.979 | D3 = 1.00 | N2 = 1.58306 | ν 2 = 30.2 |
| R4 = 10.622 | D4 = 0.67 | | |
| R5 = 25.985 | D5 = 1.30 | N3 = 1.83400 | ν 3 = 37.2 |
| R6 = −16.774 | D6 = 1.15 | | |
| R7 = 0.000 | | | |

(Numerical Example 2)

| f = 31.50 | Fno = 1:6.7 | | 2ω = 69.0° |
|---|---|---|---|
| R1 = 8.176 | D1 = 3.30 | N1 = 1.49171 | ν 1 = 57.4 |
| R2 = 16.067 | D2 = 0.95 | | |
| R3 = −16.564 | D3 = 0.80 | N2 = 1.58306 | ν 2 = 30.2 |
| R4 = 10.896 | D4 = 0.64 | | |
| R5 = 23.123 | D5 = 1.50 | N3 = 1.80440 | ν 3 = 39.6 |
| R6 = −16.518 | D6 = 1.15 | | |
| R7 = 0.000 | | | |

(Numerical Example 3)

| f = 31.57 | Fno = 1:6.7 | | 2ω = 68.8° |
|---|---|---|---|
| R1 = 8.394 | D1 = 3.41 | N1 = 1.49171 | ν 1 = 57.4 |
| R2 = 18.227 | D2 = 0.90 | | |
| R3 = −16.706 | D3 = 1.00 | N2 = 1.58306 | ν 2 = 30.2 |
| R4 = 10.788 | D4 = 0.72 | | |
| R5 = 26.029 | D5 = 1.04 | N3 = 1.83400 | ν 3 = 37.2 |
| R6 = −16.793 | D6 = 1.15 | | |
| R7 = 0.000 | | | |

(Numerical Example 4)

| f = 31.50 | Fno = 1:6.7 | | 2ω = 69.0° |
|---|---|---|---|
| R1 = 7.897 | D1 = 3.15 | N1 = 1.49171 | ν 1 = 57.4 |
| R2 = 14.373 | D2 = 0.98 | | |
| R3 = −16.738 | D3 = 1.00 | N2 = 1.58306 | ν 2 = 30.2 |
| R4 = 9.922 | D4 = 0.57 | | |
| R5 = 19.893 | D5 = 1.30 | N3 = 1.83400 | ν 3 = 37.2 |
| R6 = −17.514 | D6 = 1.15 | | |
| R7 = 0.000 | | | |

(Numerical Example 5)

| f = 32.90 | Fno = 1:6.7 | | 2ω = 66.7° |
|---|---|---|---|
| R1 = 8.736 | D1 = 3.30 | N1 = 1.49171 | ν 1 = 57.4 |
| R2 = 14.243 | D2 = 0.96 | | |
| R3 = −12.053 | D3 = 0.75 | N2 = 1.58306 | ν 2 = 30.2 |
| R4 = 11.494 | D4 = 0.41 | | |
| R5 = 19.494 | D5 = 1.30 | N3 = 1.76200 | ν 3 = 40.1 |
| R6 = −12.577 | D6 = 1.15 | | |
| R7 = 0.000 | | | |

TABLE 1

| Condition | Numerical Example | | | | |
|---|---|---|---|---|---|
| Factor | 1 | 2 | 3 | 4 | 5 |
| f1/f | 0.89 | 0.94 | 0.90 | 0.98 | 1.17 |
| (td + sk)/f | 1.10 | 1.10 | 1.09 | 1.09 | 1.10 |

TABLE 1-continued

| Condition | Numerical Example | | | | |
|---|---|---|---|---|---|
| Factor | 1 | 2 | 3 | 4 | 5 |
| N1 | 1.49 | 1.49 | 1.49 | 1.49 | 1.49 |
| N2 | 1.58 | 1.58 | 1.58 | 1.58 | 1.58 |
| N3 | 1.83 | 1.80 | 1.83 | 1.83 | 1.76 |
| f1/f3 | 2.28 | 2.44 | 2.29 | 2.71 | 3.76 |
| td/f | 0.23 | 0.23 | 0.22 | 0.22 | 0.20 |
| f2/f3 | −0.89 | −0.92 | −0.90 | −0.93 | −0.98 |
| D2/D4 | 1.36 | 1.50 | 1.24 | 1.72 | 2.32 |
| f2/f | −0.35 | −0.35 | −0.35 | −0.33 | −0.30 |

It will be appreciated from the foregoing that, according to the present embodiment, the triplet form is employed, the stop is disposed behind the lens system, and the proper rules of design are set forth for the lens shapes and other parameters, thereby it being made possible to achieve a wide angle, compact photographic lens of the back-stop type with the limitation of the total length to a minimum, while still permitting the optical performance to be kept in good balance over the entire area of the image frame, despite the increase of the angle of view to 70 degrees or thereabout.

Next, an example of application of the photographic lens of the invention to a photographing apparatus is described below.

Figure 7A:
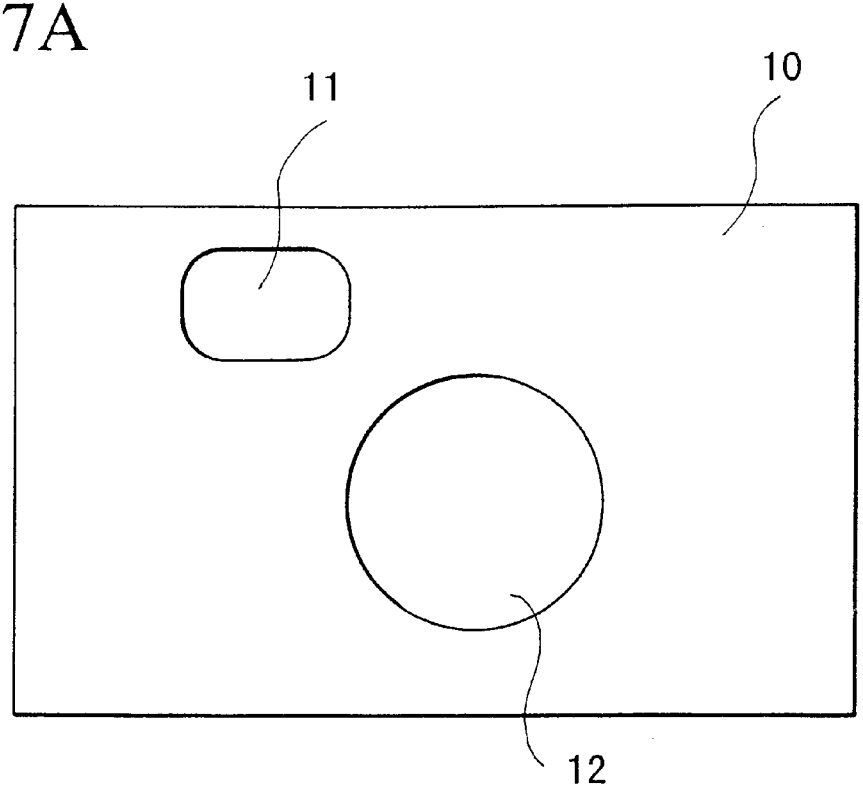
FIGS. 7A and 7B are schematic views of the main parts of a photographing apparatus.
Figure 7B:
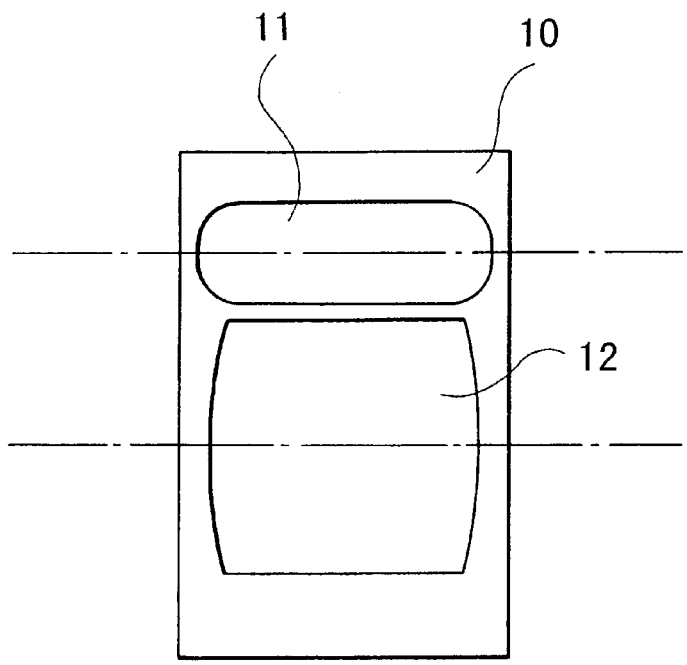

FIGS. 7A and 7B schematically show the main parts of the photographing apparatus (camera), with FIG. 7A in the front elevation view and FIG. 7B in a longitudinal section view. In FIGS. 7A and 7B, the apparatus has an apparatus casing 10 in which a viewfinder optical system 11 and the photographic lens 12 (photographing optical system) of the invention are housed. In the present embodiment, the viewfinder optical system 11 has an optical axis independent of that of the photographic lens 12.

By arranging the photographic optical system of the invention in the above manner, a reduction of the size of the apparatus can be assured. Thus, it becomes possible to realize a photographing apparatus of improved compact form while still maintaining good balance of image aberrations to be achieved over the entire area of the image frame.

What is claimed is:

1. A photographic lens comprising, in order from an object side to an image side:

a first lens of positive refractive power having a meniscus shape convex toward the object side, said first lens being made from plastic material;

a second lens of negative refractive power having a bi-concave shape, said second lens being made from plastic material;

a third lens of positive refractive power having a bi-convex shape, said third lens being made from glass material; and a stop, wherein the following conditions are satisfied:

0.8<f1/f<1.18

0.95<(td+sk)/f<1.12

1.45<N1<1.55

1.55<N2<1.65 where f1 is a focal length of said first lens, f is a focal length of the entire photographic lens, td is a distance from a lens surface on the object side of said first lens to a lens surface on the image side of said third lens, sk is a back focal distance during focusing on an infinitely distant object, and N1 and N2 are refractive indices of materials of said first lens and said second lens, respectively.

2. A photographic lens according to claim 1, wherein all lens surfaces of said first lens, said second lens and said third lens are spherical.

3. A photographic lens according to claim 1, satisfying the following condition:

$$1.75 < N3$$

where N3 is a refractive index of material of said third lens.

4. A photographic lens according to claim 1, satisfying the following condition:

$$2 < f1/f3 < 4$$

where f1 and f3 are focal lengths of said first lens and said third lens, respectively.

5. A photographic lens according to claim 1, satisfying the following conditions:

$$0.2 < td/f < 0.25$$

$$-1 < f2/f3 < -0.8$$

$$1 < D2/D4 < 2.5$$

$$-0.4 < f2/f < -0.25$$

where f2 and f3 are focal lengths of said second lens and said third lens, respectively, and D2 and D4 are axial separations between said first lens and said second lens and between said second lens and said third lens, respectively.

6. A photographing apparatus comprising:

a photographic lens according to one of claims 1 to 5; and a casing which holds said photographic lens.

* * * * *

UNITED STATES PATENT AND TRADEMARK OFFICE
CERTIFICATE OF CORRECTION

PATENT NO.   : 6,069,751
DATED        : May 30, 2000
INVENTOR(S)  : Hiroshi Saito It is certified that error appears in the above-identified patent and that said Letters Patent is hereby corrected as shown below:

Column 1:
Line 23, "a" should be deleted.
Line 25, "make" should read -- making --.

Column 3:
Line 4, "to' (second occurrence) should read -- into--.
Line 7, "to" should read -- into --.
Line 8, "to" should read -- into --.
Line 41, "of" should read -- on --.

Signed and Sealed this

Ninth Day of October, 2001

Attest:

*Nicholas P. Godici*

NICHOLAS P. GODICI
*Attesting Officer*  *Acting Director of the United States Patent and Trademark Office*